US012717581B2

(12) United States Patent
Castorina et al.

(10) Patent No.: US 12,717,581 B2
(45) Date of Patent: Aug. 25, 2026

(54) UPDATING TRAINING DATA

(71) Applicant: Arm Limited, Cambridge (GB)

(72) Inventors: Ugo Castorina, Biot (FR); Damien Matthieu Valentin Cathrine, Mougins (FR); Orestis Chiotakis, Nice (FR); Vincenzo Consales, Golfe Juan (FR)

(73) Assignee: Arm Limited, Cambridge (GB)

( * ) Notice: Subject to any disclaimer, the term of this patent is extended or adjusted under 35 U.S.C. 154(b) by 28 days.

(21) Appl. No.: 19/029,412

(22) Filed: Jan. 17, 2025

(65) Prior Publication Data

US 2026/0126999 A1 May 7, 2026

(30) Foreign Application Priority Data

Nov. 7, 2024 (EP) .................................... 24386126

(51) Int. Cl.
*G06F 9/30* (2018.01)
*G06F 12/0862* (2016.01)

(52) U.S. Cl.
CPC ...... *G06F 9/30047* (2013.01); *G06F 12/0862* (2013.01)

(58) Field of Classification Search
CPC .. G06F 9/30047; G06F 12/0862; G06F 12/08; G06F 12/0802; G06F 12/0888; G06F 12/0893; G06F 12/0895
See application file for complete search history.

(56) References Cited

U.S. PATENT DOCUMENTS

| | | | | |
|---|---|---|---|---|
| 11,675,702 | B1 * | 6/2023 | Castorina | G06F 9/3832 711/118 |
| 2015/0278100 | A1 * | 10/2015 | Sundaram | G06F 9/3836 711/137 |
| 2017/0344483 | A1 * | 11/2017 | Shwartsman | G06F 12/0862 |
| 2020/0082280 | A1 * | 3/2020 | Orion | G06F 12/0862 |
| 2026/0044345 | A1 * | 2/2026 | Hadley | G06F 8/4442 |

* cited by examiner

*Primary Examiner* — Michael Krofcheck
(74) *Attorney, Agent, or Firm* — NIXON & VANDERHYE P.C.

(57) ABSTRACT

There is provided an apparatus comprising training storage circuitry configured to store training entries, each comprising training data indicative of a trigger memory access request to local storage. The apparatus comprises filter circuitry to generate a filtered sequence of memory access requests by applying a filter to a sequence of memory access requests. The apparatus comprises training circuitry to monitor the filtered sequence, and responsive to observation of the trigger memory access request indicated in a training entry, to update the training data in the training entry. The filter circuitry is configured for each memory access request of the sequence that resulted in a hit on a data item in the local storage, to include the memory access request in the filtered sequence in dependence on a filter criterion independent of a type of request that resulted in the data item being allocated to the local storage.

20 Claims, 8 Drawing Sheets

UPDATING TRAINING DATA

TECHNICAL FIELD

The present invention relates to data processing. More particularly the present invention relates to an apparatus, a system, a chip containing product, a method, and a computer-readable medium.

BACKGROUND

Some apparatuses are provided with predictive structures configured to generate speculative memory access requests for retrieval of data into local storage circuitry. The predictive structures determine the data to be retrieved based on training data which is generated by training circuitry.

SUMMARY

According to a first aspect of the present techniques there is provided an apparatus comprising:

training storage circuitry configured to store one or more training entries, each of the one or more training entries comprising training data indicative of a trigger memory access request to a local storage structure and one or more relationships between the trigger memory access request and subsequent memory access requests to the local storage structure, wherein the training data is suitable to be used for generation of speculative memory access requests for retrieval of data into the local storage structure by a predictive structure in response to observation of the trigger memory access request;

filter circuitry configured to generate a filtered sequence of memory access requests by applying a filter to a sequence of memory access requests to the local storage structure; and training circuitry configured to monitor the filtered sequence of memory access requests, and responsive to observation of the trigger memory access request indicated in a training entry of the one or more training entries, to update the training data in the training entry based on the filtered sequence of memory access requests, wherein:

the filter circuitry is configured for each given memory access request of the sequence of memory access requests that resulted in a hit on a data item in the local storage structure, to include the given memory access request in the filtered sequence of memory access requests in dependence on a filter criterion; and the filter criterion is independent of a type of request that resulted in the data item being allocated into the local storage structure.

According to a second aspect of the present techniques there is provided a system comprising:

the apparatus according to the first aspect, implemented in at least one packaged chip;

at least one system component; and a board, wherein the at least one packaged chip and the at least one system component are assembled on the board.

According to a third aspect of the present techniques there is provided a chip-containing product comprising the system according to the second aspect, wherein the system is assembled on a further board with at least one other product component.

According to a fourth aspect of the present techniques there is provided a method of operating an apparatus comprising training storage circuitry configured to store one or more training entries, each of the one or more training entries comprising training data indicative of a trigger memory access request to a local storage structure and one or more relationships between the trigger memory access request and subsequent memory access requests to the local storage structure, wherein the training data is suitable to be used for generation of speculative memory access requests for retrieval of data into the local storage structure by a predictive structure in response to observation of the trigger memory access request, the method comprising:

generating a filtered sequence of memory access requests by applying a filter to a sequence of memory access requests to the local storage structure;

for each given memory access request of the sequence of memory access requests that resulted in a hit on a data item in the local storage structure, including the given memory access request in the filtered sequence of memory access requests in dependence on a filter criterion, wherein the filter criterion is independent of a type of request that resulted in the data item being allocated into the local storage structure;

monitoring the filtered sequence of memory access requests; and in response to observation of the trigger memory access request indicated in a training entry of the one or more training entries, updating the training data in the training entry based on the filtered sequence of memory access requests.

According to a fifth aspect of the present techniques there is provided a non-transitory computer-readable medium storing computer-readable code for fabrication of an apparatus comprising:

training storage circuitry configured to store one or more training entries, each of the one or more training entries comprising training data indicative of a trigger memory access request to a local storage structure and one or more relationships between the trigger memory access request and subsequent memory access requests to the local storage structure, wherein the training data is suitable to be used for generation of speculative memory access requests for retrieval of data into the local storage structure by a predictive structure in response to observation of the trigger memory access request;

filter circuitry configured to generate a filtered sequence of memory access requests by applying a filter to a sequence of memory access requests to the local storage structure; and training circuitry configured to monitor the filtered sequence of memory access requests, and responsive to observation of the trigger memory access request indicated in a training entry of the one or more training entries, to update the training data in the training entry based on the filtered sequence of memory access requests, wherein:

the filter circuitry is configured for each given memory access request of the sequence of memory access requests that resulted in a hit on a data item in the local storage structure, to include the given memory access request in the filtered sequence of memory access requests in dependence on a filter criterion; and the filter criterion is independent of a type of request that resulted in the data item being allocated into the local storage structure.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
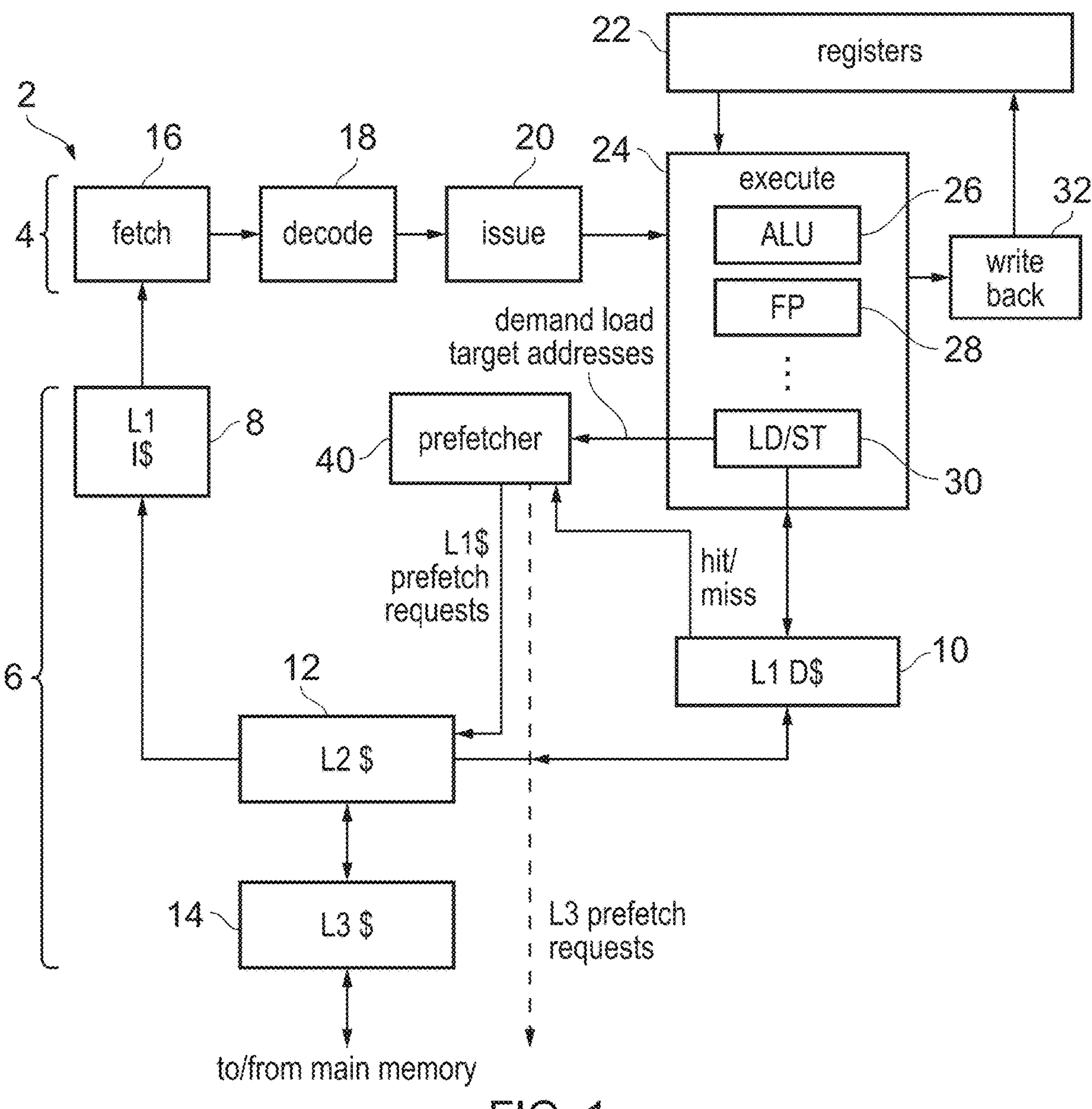
FIG. 1 schematically illustrates an apparatus according to some configurations of the present techniques.

Before discussing the configurations with reference to the accompanying figures, the following description of configurations is provided.

According to some configurations of the present techniques there is provided an apparatus comprising training storage circuitry configured to store one or more training entries, each of the one or more training entries comprising training data indicative of a trigger memory access request to a local storage structure and one or more relationships between the trigger memory access request and subsequent memory access requests to the local storage structure. The training data is suitable to be used for generation of speculative memory access requests for retrieval of data into the local storage structure by a predictive structure in response to observation of the trigger memory access request. The apparatus comprises filter circuitry configured to generate a filtered sequence of memory access requests by applying a filter to a sequence of memory access requests to the local storage structure. The apparatus comprises training circuitry configured to monitor the filtered sequence of memory access requests, and responsive to observation of the trigger memory access request indicated in a training entry of the one or more training entries, to update the training data in the training entry based on the filtered sequence of memory access requests. The filter circuitry is configured for each given memory access request of the sequence of memory access requests that resulted in a hit on a data item in the local storage structure, to include the given memory access request in the filtered sequence of memory access requests in dependence on a filter criterion. The filter criterion is independent of a type of request that resulted in the data item being allocated into the local storage structure.

The training circuitry stores one training entry or plural training entries which are currently being trained. The training data includes an indication of a trigger memory access request which may be identified, for example, based on a memory address accessed by the trigger memory access, or a program counter value (or instruction pointer value) indicative of a load/store operation that resulted in the trigger memory access. The training data also includes information identifying one or more relationships between the trigger memory access request and one or more subsequent memory access requests. For example, the relationship may be a stride relationship indicating a stride offset between the trigger memory access request and one or more further memory access requests. As an alternative example, the relationship may be a producer-consumer relationship indicating an address offset between data returned as a result of the target memory access request and a subsequent consumer memory access request. Regardless of the particular relationship, the training data is suitable for being used by the predictive structure to generate the speculative memory access requests to retrieve data into the local storage structure.

The local storage structure may be part of a memory hierarchy that is located closer to processing circuitry relative to at least one other storage structure that forms part of the memory hierarchy. In this context the local storage structure being closer to the processing circuitry should be interpreted as the local storage structure being arranged such that data stored in the local storage structure can be accessed in fewer clock cycles than data that is stored in one or more other storage structures that are further from the processing circuitry. The local storage circuitry may therefore be geometrically closer than the one or more other storage structures. Alternatively, the local storage circuitry may be geometrically further than one of the one or more other storage structures but with a faster data path to the processing circuitry. The local storage structure may be the closest storage structure to the processing circuitry, alternatively there may be one or more local storage structures that are closer to the processing circuitry than the local storage structure.

During training, memory access requests may be monitored in order to detect whether the relationship (or relationships) indicated in the training entry are observed and, if the relationship(s) are observed, then a confidence indicator stored in association with that relationship may be increased. Alternatively, if a new relationship is detected, it may be allocated as a new relationship that is associated with the training entry. The manner in which the training circuitry updates the training entry may be specific to the particular predictive structure and may vary dependent on the particular implementation. Whilst it may be theoretically possible to monitor every memory access request to detect all possible relationships, it may not be desirable to do so. A memory access request will either result in a hit in the local storage circuitry (i.e., the data is already present in the local storage structure) or it will result in a miss in the local storage circuitry (i.e., the data is not present in the local storage structure). Of the memory access requests that result in a hit in the local storage circuitry, the memory access request could hit on data that was already present due to at least two different types of request: a previous speculative request for that data to be retrieved (a hit on speculatively retrieved data), and/or a previous non-speculative request (otherwise referred to as a demand request) for that data to be retrieved (a hit on non-speculatively retrieved data). Of these options, a lookup resulting in a miss is a potential opportunity for the predictive structure to issue a speculative memory access at some future point in order that, when/if that segment of code is repeated, the speculative memory access could pre-emptively request data from the address that resulted in the miss into the local storage structure to prevent a future miss. In addition, a hit on speculatively retrieved data indicates that a speculative structure, for example, operating according to a previously trained entry, has successfully predicted data that will be used in the future. The use of memory access requests that resulted in a miss and memory access requests that resulted in a hit on speculatively retrieved data may therefore allow for productive training of the training entry.

On the other hand, a hit on non-speculatively retrieved data indicates data that has already retrieved by the processing circuitry, e.g., due to a previous non-speculative request. Whilst such data could be used to update the training entries, this could result in unnecessary relationships in the training entry which, in turn could lead to speculative requests being issued for data that is already present in the local storage circuitry. This could lead to wasted bandwidth due to unnecessary speculative requests, an increased power consumption due to both training and speculatively issuing any resulting memory access requests, and could result in pollution of training entries reducing the availability of storage space that could be used to store relationships between trigger memory access requests and other memory access requests that are not already retrieved by non-speculative requests. Whilst this problem could potentially be solved by neglecting all hits on non-speculatively retrieved data, the inventors have realised that there are situations in which it may be beneficial to include some hits on non-speculatively retrieved data when updating training entries. In particular, as prefetch circuitry becomes more complex and capable of adapting to a wider range of different workloads, patterns of memory access requests may be identified for which at least some of the memory accesses result in a hit on non-speculatively retrieved data during some instances of that code being run. However, other instances of the code being run may mean that the pattern is observed with some of the same memory accesses instructions resulting in hits on speculatively retrieved data or misses in the local storage circuitry. In such workloads, it would be beneficial to train the prefetcher on hits on non-speculatively retrieved data.

The apparatus is provided with filter circuitry configured to receive a sequence of memory access requests to the local storage circuitry and to generate a filtered sequence of memory access requests for the training circuitry. The filtered sequence of memory access requests is used by the training circuitry to update the training entry. The filter circuitry is configured to include memory accesses that resulted in a miss in the filtered sequence of memory access requests. The filter circuitry is also configured to include some memory access requests that resulted in a hit in the filtered sequence of memory access requests. The filter circuitry determines whether or not to include the memory access requests that resulted in a hit based on a filter criterion. The filter criterion will be discussed in further detail below and, in general can be based on any criterion other than a type of the request that resulted in the data item being allocated into the local storage circuitry. In other words, the filter circuitry performs at least one filtering process to determine whether a memory access request for a data item that resulted in a hit in the local storage circuitry should be included in the filtered sequence independently (i.e., without reference to) whether the access request that previously pulled the data item into the local storage circuitry was a speculative request or whether it was a demand request. As a result, the training circuitry is able to update (e.g., to train) the training entries including at least some memory access requests that resulted in a hit on non-speculatively retrieved data. The filter circuitry therefore provides improved flexibility for the training circuitry and enables the training circuitry to capture a greater range of workloads and to support the types of access patterns that can be supported by speculative structures.

The filter criterion may not be the only criterion applied to the memory accesses that resulted in a hit in the local storage circuitry. For example, the filter criterion may be applied subsequent to, or prior to, a further filter criterion. The further filter criterion may, for example, filter the memory access requests that resulted in a hit based on a type of the request that resulted in the data item being allocated into the local storage structure. Those hits that resulted from a speculative request may be forwarded straight to the filtered sequence of memory access requests with the filter criterion being applied to those requests that resulted in a non-speculative hit. In configurations in which there is a further filter criterion, the filter criterion discussed above is also applied and is independent of the type of request. The filter criterion may therefore be either the only filtering applied to the memory access requests that resulted in a hit or an additional filtering that is applied subsequent to or prior to the further filter criterion.

In some configurations the filter criterion is based on the training data comprised in the one or more training entries. The filtering may be based on whether the memory access request is identified in the training entry as the trigger memory access and/or whether the memory access request is identified in the training entry in one of the one or more relationships. Alternatively, the filter criterion may, for example, be dependent on a type of the one or more relationships comprised in the training entry, a region of memory being accessed according to at least one of the one or more relationships, and/or metadata stored in the one or more relationships.

In some configurations the filter circuitry is configured: to perform a determination, for each given memory access request of the sequence of memory access requests that resulted in a hit on a data item in the local storage structure, of whether the given memory access request is comprised in the training data comprised in the one or more training entries; and in response to the given memory access request being comprised in the training data, to include the given memory access request in the filtered sequence of memory access requests. In other words, the filtering may be performed on a per training entry basis such that, where multiple (plural) training entries are present, a different filtering applied to memory accesses for each of the training entries. Alternatively, the filtering may be common to all training entries with a memory access request either being included in the filtered sequence of memory access requests for all training entries or being excluded from the filtered sequence of memory access requests for all training entries dependent on the filter criterion.

In some configurations the determination comprises performing a lookup based on an identifier derived from the given memory access request. The identifier may relate to a target of the memory access request, for example, a target memory address or a memory address offset from a base memory address. Alternatively, the identifier may be derived from the given memory access request, for example, a program counter value or an instruction pointer value indicating the instruction that resulted in the memory access request.

In some configurations the identifier comprises at least one of: a hash of a program counter value of the given memory access request; and a micro operation identifier of the given memory access request assigned during processing of the given memory access request. The program counter value identifies a particular instruction in a sequence of instructions. On the other hand, the micro operation identifier may be assigned during processing, for example, by decoding circuitry in response to receiving an instruction (i.e., one of a plurality of possible instructions identified by an instruction set architecture). The identifier may be based on one or both of the program counter value and the micro operation identifier and provides a way of identifying a source of the memory access request that can be recorded in the training entry. The hash may be a lossy or a lossless hash of the program counter value and may also comprise a hash of the micro operation identifier.

There are a variety of ways in which the determination could be performed. In some configurations the determination comprises performing the lookup in the training storage circuitry. In other words, for each given memory access, a lookup is performed in the training storage circuitry by providing the identifier for the memory access request to the training storage circuitry. The training storage circuitry is responsive to the identifier to compare that identifier against identifiers stored in the training storage circuitry in order to determine whether the identifier is already present in the training storage circuitry. This approach ensures that every identifier in the training storage circuitry is included in the lookup.

In some configurations the apparatus comprises buffer storage circuitry configured to store training data identifying information derived from the training data and indicative of the trigger memory access request and/or the subsequent memory access requests indicated in the training data, wherein the determination comprises performing the lookup in the buffer storage circuitry. The inclusion of buffer storage circuitry separate to the training storage circuitry, avoids the need for additional ports to be added to the training storage circuitry to facilitate the lookup and may result in a simpler design for the training storage circuitry. The training data identifying information can be stored in the buffer storage circuitry in addition to the training circuitry and may comprise either a complete list of the identifiers stored in the training storage circuitry, a subset of the information included in the training storage circuitry, or information derived from the whole or a subset of the information included in the training storage circuitry.

In some configurations the training data identifying information comprises a list of training identifiers associated with the trigger memory access request and/or the subsequent memory access requests indicated in the training data. The training identifiers may be provided as a full training identifier or as a hash of each of the training identifiers. In some configurations the training data identifying information may distinguish between whether the identifiers are associated with the trigger memory access request or the subsequent memory access requests and the filter criterion may be further based on this distinction. For example, the list may associate additional metadata with each entry in the list indicating whether it is indicative of a trigger memory access request or a subsequent memory access request. Alternatively, separate sub lists may be provided with a first sub list being used to store identifiers associated with the trigger memory access request and a second sub list being used to store identifiers associated with the subsequent memory access requests.

In some configurations the training data identifying information comprises a combined hash value derived by combining training identifiers associated with the trigger memory access request and/or the subsequent memory access requests indicated in the training data. The hash values may be combined in any way, for example, the hash values may be combined by performing a logical OR of all the hash values and the determination comprises comparing the identifier for the given memory request against the result of the logical OR to determine whether the group of bits that are set in the identifier are all included in the result of the logical OR.

In some configurations the buffer storage circuitry is configured as a Bloom filter and the combined hash value is derived by applying the Bloom filter to the training identifiers. A Bloom filter stores a combined hash value that is indicative of the training identifiers. The stored hash value is generated from a combination of hash values of each of the training identifiers such that a given hash of a given identifier, where the given identifier falls within the set of identifiers from which the combined hash is generated, will already be present in the combined hash value. As a result, the act of adding the given hash value to the combined hash value will result in the same combined hash value. A determination of whether the given identifier for the given memory request is included in the combined hash value using a Bloom filter provides a compact way of storing the training data identifying information. A Bloom filter will allow false positives but that does not allow false negatives. In other words, the result of the determination is either an indication that the identifier for the given memory request is possibly in the set of values from which the combined has was derived, or definitely not in the set. In some configurations the Bloom filter may generate the combined hash based on both of the identifiers associated with the trigger memory access requests and the subsequent memory access requests. Alternatively, in some configurations, the Bloom filter may generate the combined hash based on either the set of identifiers associated with the trigger memory access requests or the set of identifiers associated with the subsequent memory access requests.

Whilst the predictive structure can be any predictive structure, for example relating to the fetching of data (which may include data representative of one or more instructions to be performed by processing circuitry), in some configurations the predictive structure is prefetching circuitry configured to speculatively issue prefetch requests for the data to be retrieved into the local storage structure in advance of a demand request for the data. The prefetching circuitry may be any prefetching circuitry and may identify data to prefetch based on a stride access pattern, a producer-consumer relationship, pattern identification, or any other prefetching algorithm. Where the prefetching circuitry is based on a stride access pattern, the trigger memory access request and the subsequent memory access requests may be identified by the same identifier. For example, the same load instruction having the same program counter value could, in some use cases, be repeated accessing an address that is incremented on each iteration of the same load instruction.

In some configurations the prefetching circuitry is arranged as indirect prefetching circuitry configured to prefetch producer data indicative of a consumer memory address, and to prefetch consumer data based on the consumer memory address. The data indicative of the consumer memory address may be the consumer memory address. Alternatively, the data indicative of the consumer memory address may comprise data from which the consumer memory address is derived. For example, the data indicative of the consumer memory address may be one of a base address and an offset and the consumer memory address may be derived by combining the data indicative of the consumer memory address with the other of the baes address and the offset which may be stored in a register or provided as an immediate value in an instruction specifying the consumer memory access request.

In some configurations, the filter criterion may be based on a type of the given memory access request. In other words, if the given memory access request hits in the local storage circuitry, it may only be included if the given memory access request is of a given type. The given memory access request may be tagged to indicate the type of the given memory access, i.e., whether or not it is a prefetch request, and when it is a prefetch request, information identifying the prefetch circuitry that generated that prefetch request and/or additional data to identify it as a consumer memory access request. The filter circuitry may be configured to identify the type of the given memory access request and to include the given memory access request in the filtered sequence of memory access requests based on the type of the given memory access requests. In some configurations the filter circuitry is configured to include the given memory access request in the filtered sequence of memory access requests when the given memory access request is identified as a prefetch request for consumer data in the training data. In general, the sequence of memory access requests for consumer data do not necessarily follow a strict pattern in terms of the memory addresses accessed. It is therefore possible that one or more items of consumer data may already be present in the local storage circuitry during some occurrences of execution of the sequence of instructions and may not be present during other occurrences. Including the given memory access request in the filtered sequence of memory accessed requests when the given memory access request is a prefetch request for consumer data allows for improved training of these types of requests whilst maintaining the benefits associated with excluding other hits on non-speculatively retrieved data as discussed above.

In some configurations the filter circuitry is responsive to the monitored access request satisfying the filter criterion, to include the monitored memory access request in the filtered sequence of memory access requests; and the filter circuitry is responsive to the monitored access request failing to satisfy the filter criterion, to exclude the monitored memory access request from the filtered sequence of memory access requests. In some configurations the filter circuitry is responsive to the monitored access request satisfying the filter criterion, to include the monitored memory access request in the filtered sequence of memory access requests; the filter circuitry is responsive to the monitored access request failing to satisfy the filter criterion, to determine if the monitored memory access request resulted in a hit on a speculatively retrieved entry in the local storage structure and, when the monitored memory access request resulted in the hit on the speculatively retrieved entry, to include the monitored memory access request in the filtered sequence; and the filter circuitry is responsive to the monitored memory access request resulting in a hit on a non-speculatively retrieved entry and failing to satisfy the filter criterion, to exclude the monitored memory access request from the filtered sequence of memory access requests.

In some configurations the filter circuitry is configured to include in the filtered sequence of memory access requests at least a first set of the sequence of memory access requests that resulted in a hit in the local storage structure, and to exclude from the filtered sequence of memory access requests at least a second set of the sequence of memory access requests that resulted in a hit in the local storage structure. The criterion (or criteria) defining the first set and the second set is configured such that at least some types of memory access requests may be comprised in the first set and at least some types of memory access requests may be comprised in the second set.

In some configurations the first set comprises memory access requests that are already identified in at least one of the one or more training entries; and the second set comprises memory access requests that are not identified in at least one of the one or more training entries.

Particular configurations will now be described with reference to the figures.

FIG. 1 illustrates an example of a data processing apparatus 2 according to some configurations of the present techniques. The apparatus has a processing pipeline 4 for processing program instructions fetched from a memory system 6. The memory system in this example includes a level 1 instruction cache 8, a level 1 data cache 10, a level 2 cache 12 shared between instructions and data, a level 3 cache 14, and main memory which is not illustrated in FIG. 1 but may be accessed in response to requests issued by the processing pipeline 4. It will be appreciated that other examples could have a different arrangement of caches with different numbers of cache levels or with a different hierarchy regarding instruction caching and data caching (e.g. different numbers of levels of cache could be provided for the instruction caches compared to data caches).

The processing pipeline 4 includes a fetch stage 60 for fetching program instructions from the instruction cache 8 or other parts of the memory system 6. The fetched instructions are decoded by a decode stage 18 to identify the types of instructions represented and generate control signals for controlling downstream stages of the pipeline 4 to process the instructions according to the identified instruction types. The decode stage passes the decoded instructions to an issue stage 20 which checks whether any operands required for the instructions are available in registers 22 and issues an instruction for execution when its operands are available (or when it is detected that the operands will be available by the time they reach the execute stage 24). The execute stage 24 includes a number of functional units 26, 28, 30 for performing the processing operations associated with respective types of instructions. For example, in FIG. 1 the execute stage 24 is shown as including an arithmetic/logic unit (ALU) 26 for performing arithmetic operations such as add or multiply and logical operations such as AND, OR, NOT, etc. Also the execute unit includes a floating point unit 28 for performing operations involving operands or results represented as a floating-point number. Also the functional units include a load/store unit 30 for executing load instructions to load data from the memory system 6 to the registers 22 or store instructions to store data from the registers 22 to the memory system 6. Load requests issued by the load/store unit 30 in response to executed load instructions may be referred to as demand load requests discussed below. Store requests issued by the load/store unit 30 in response to executed store instructions may be referred to as demand store requests. The demand load requests and demand store requests may be collectively referred to as demand memory access requests. It will be appreciated that the functional units shown in FIG. 1 are just one example, and other examples could have additional types of functional units, or could have multiple functional units of the same type, or may not include all of the types shown in FIG. 1 (e.g. some processors may not have support for floating-point processing). The results of the executed instructions are written back to the registers 22 by a write back stage 32 of the processing pipeline 4.

It will be appreciated that the pipeline architecture shown in FIG. 1 is just one example and other examples could have additional pipeline stages or a different arrangement of pipeline stages. For example, in an out-of-order processor a register rename stage may be provided for mapping architectural registers specified by program instructions to physical registers identifying the registers 22 provided in hardware. Also, it will be appreciated that FIG. 1 does not show all of the components of the data processing apparatus and that other components could also be provided. For example, a branch predictor may be provided to predict outcomes of branch instructions so that the fetch stage 16 can fetch subsequent instructions beyond the branch earlier than if waiting for the actual branch outcome. Also a memory management unit could be provided for controlling address translation between virtual addresses specified by the program instructions and physical addresses used by the memory system.

As shown in FIG. 1, the apparatus 2 has a prefetcher 40 (an example of a predictive structure) for analysing patterns of demand target addresses specified by demand memory access requests issued by the load/store unit 30, and detecting stride sequences of addresses where there are a number of addresses separated at regular intervals of a constant stride value. The prefetcher 40 uses the detected stride address sequences to generate prefetch load requests which are issued to the memory system 6 to request that data is brought into a given level of cache. The prefetch load requests are not directly triggered by a particular instruction executed by the pipeline 4, but are issued speculatively with the aim of ensuring that when a subsequent load/store instruction reaches the execute stage 24, the data it requires may already be present within one of the caches, to speed up the processing of that load/store instruction and therefore reduce the likelihood that the pipeline has to be stalled. The prefetcher 40 may be able to perform prefetching into a single cache or into multiple caches. For example, FIG. 1 shows an example of the prefetcher 40 issuing level 1 cache prefetch requests which are sent to the level 2 cache 12 or downstream memory and request that data from prefetch target addresses is brought into the level 1 data cache 10. Also the prefetcher 40 in this example can also issue level 3 prefetch requests to the main memory requesting that data from prefetch target addresses is loaded into the level 3 cache 14. The level 3 prefetch request may look a longer distance into the future than the level 1 prefetch requests to account for the greater latency expected in obtaining data from main memory into the level 3 cache 14 compared to obtaining data from a level 2 cache into the level 1 cache 10. In systems using both level 1 and level 3 prefetching, the level 3 prefetching can increase the likelihood that data requested by a level 1 prefetch request is already in the level 3 cache. However, it will be appreciated that the particular caches loaded based on the prefetch requests may vary depending on the particular circuit of implementation.

It would be readily apparent to the skilled person that a stride based prefetcher, such as the one described in relation to FIG. 1 is merely one example of a possible prefetcher. The prefetcher may, in some configurations, predict access patterns based on a producer-consumer relationship between two memory access instructions. The person of ordinary skill in the art would appreciate that the prefetch generation circuitry can be of any form and use any algorithm to generate the prefetch requests.

Figure 2:
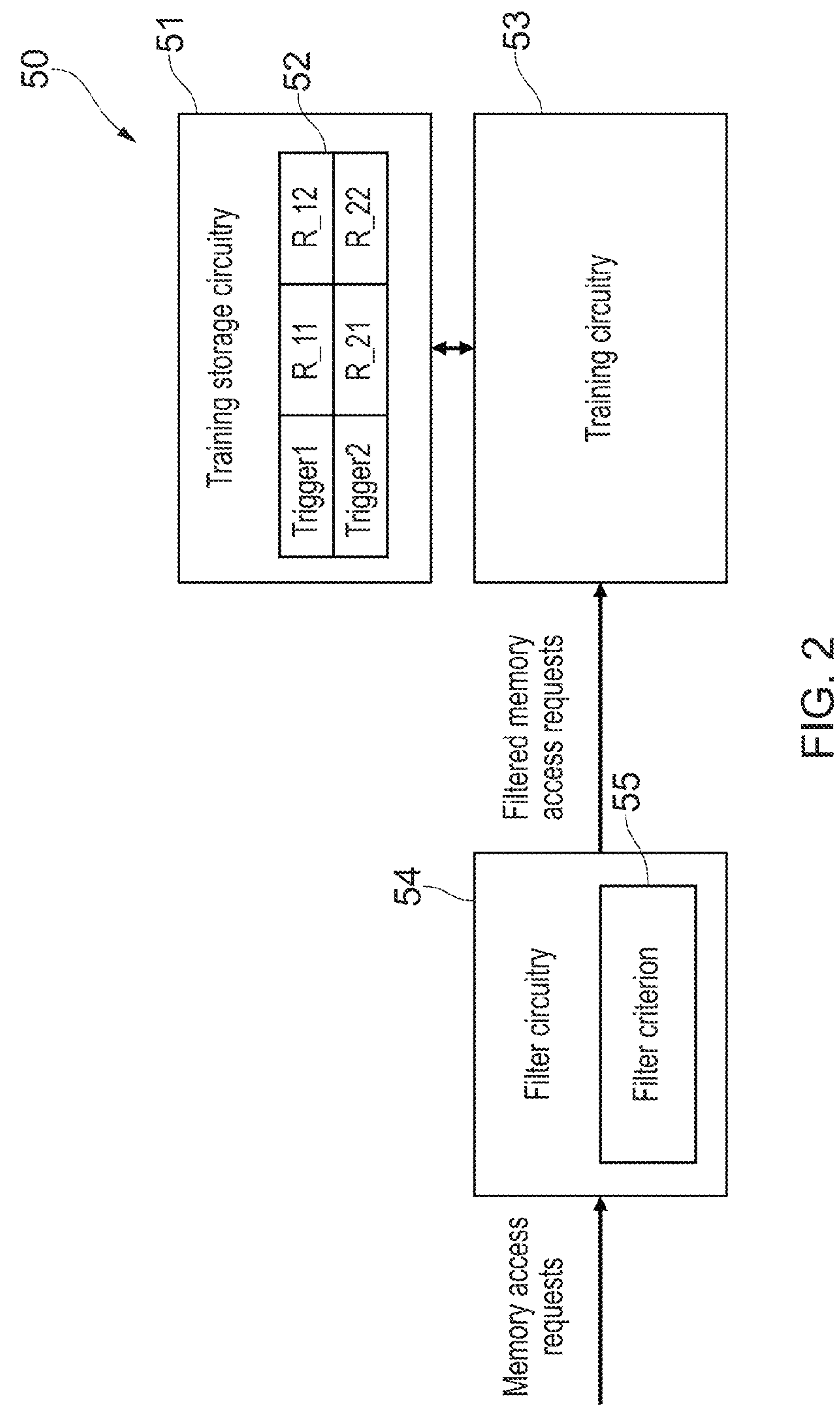
FIG. 2 schematically illustrates an apparatus according to some configurations of the present techniques.

FIG. 2 schematically illustrates an apparatus 50 according to some configurations of the present techniques. The apparatus 50 is provided with training storage circuitry 51, training circuitry 53, and filter circuitry 54. The training storage circuitry 51 is arranged to store one or more training storage entries, in the illustrated configuration the training storage circuitry comprises storage for two training entries 52. Each of the training entries 52 identifies a trigger and two relationships between that trigger entry and one or more subsequent memory access requests. The training storage circuitry 51 is coupled to the training circuitry 53 which receives a filtered sequence of memory access requests. The training circuitry 53 receives the filtered sequence of memory access requests and updates the training entries 52 that are stored in the training storage circuitry 51. The updating comprises generating new relationships between the triggers stored in the training entries 52 and one or more further entries, and/or updating existing relationships, to increase confidence in the relationships based on a repeated observation of the relationship.

The training circuitry 53 is coupled to filter circuitry 54 which receives a sequence of memory access requests and generates a filtered sequence of memory access requests based on a filter criterion 55. The sequence of memory access requests comprises memory access requests that have hit in local storage circuitry and memory access requests that have missed in the local storage circuitry. The filter circuitry 54 is configured to include in the filtered sequence of memory access requests, the memory accesses that have missed in the local storage circuitry and a subset of the memory access requests that hit in the local storage circuitry in dependence on the filter criterion 55. The filter criterion 55 is independent of a type of request that resulted in a data item identified in the memory access request (for example, identified by a target address) being allocated into the local storage structure. In other words, the filter criterion 55 is dependent on a factor other than whether the data item was previously allocated into the local storage structure as a result of a demand request or a prefetch request (an example of a speculative request).

The filter circuitry 54 therefore acts to exclude a subset of the sequence of memory access requests that have resulted in a hit in the local storage circuitry resulting in improved power efficiency and a reduction in a number of unnecessary relationships in the training entry which, in turn could lead to speculative requests being issued for data that is already present in the local storage circuitry.

In some alternative configurations, the filter circuitry 54 may be provided with one or more further filter conditions which may act to perform a further set of filtering that excludes one or more memory access requests that are not excluded by the filter criterion 55. Alternatively, the one or more further filter conditions may act to include one or more memory access requests (e.g., one or more of those that have been excluded by the filter criterion 55) in the filtered memory access requests.

Figure 3:
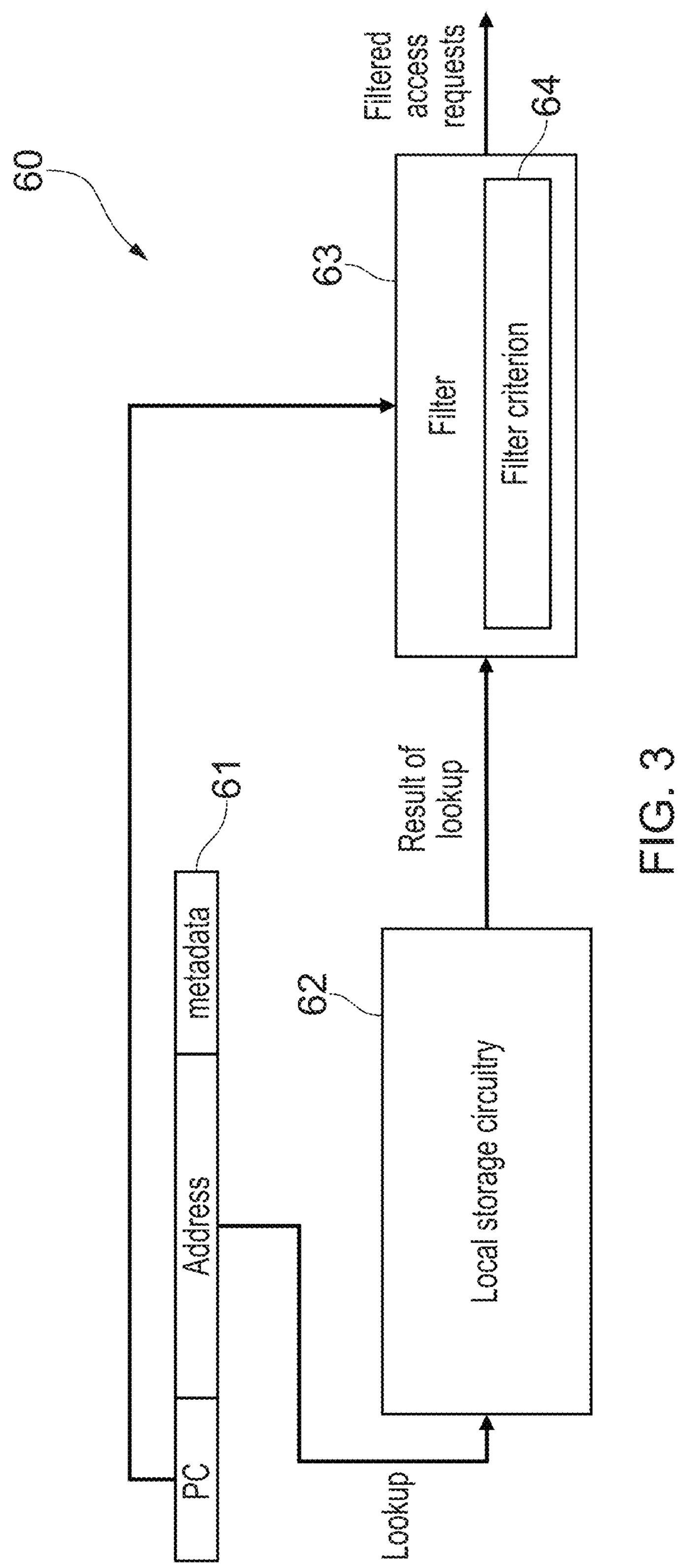
FIG. 3 schematically illustrates an apparatus according to some configurations of the present techniques.

FIG. 3 schematically illustrates further details of an apparatus 60 according to some configurations of the present techniques. In particular, the apparatus 60 is provided with filter circuitry 63 and local storage circuitry 62. The local storage circuitry 62 is configured to store data items (which may include data items comprising one or more instructions to be processed by processing circuitry). The local storage circuitry is responsive to a memory access request 61 to perform a lookup in the local storage circuitry 62 to determine if a data item stored at the address identified in the memory access request 61 is stored in that local storage circuitry. The memory access request 61 (which may be a load or a store memory access request) also comprises a program counter (PC) value indicative of a program counter value of an instruction that resulted in the memory access request 61 being issued along with metadata associated with the memory access request 61. The metadata may include, for example, an indication of whether the memory access request 61 is a demand request or a prefetch request and, when the memory access request 61 is a prefetch request, one or more items of information associated with the prefetch request.

The local storage circuitry 62 is responsive to receipt of the memory access request 61 and performs a lookup to determine if data stored at the address is present in the local storage circuitry 62. When the data is present in the local storage circuitry 62, the local storage circuitry 62 returns the data to be used by the processing circuitry from which the memory access request 61 originated. When the data is not present in the local storage circuitry 62, the local storage circuitry 62 forwards the memory access request to a next level storage structure in the memory hierarchy. In addition, the local storage circuitry 62 indicates a result of the lookup to the filter circuitry 63. In particular, the local storage circuitry 62 indicates whether the lookup resulted in a hit or a miss and, when the lookup resulted in a hit, whether that hit was a hit on an entry that was prefetched into the local storage circuitry 62 or a hit on an entry that was fetched into the local storage circuitry 62 as a result of a demand request. The filter circuitry 63 receives the result of the lookup from the local storage circuitry 62 and information indicative of the memory access request 61. The filter circuitry 63 then determines whether to forward the memory access request as one of the filtered memory accessed requests based on the filter criterion 64. When the result of the lookup is a miss in the local storage circuitry 62, the filter circuitry 63 forwards the filter memory access request as one of the filtered access requests. When the result of the lookup is a hit in the local storage circuitry 62, the filter circuitry applies the filter criterion 64 to determine whether to forward the memory access request 61 as one of the filtered memory accessed requests.

As discussed above, in some configurations, the filter criterion 64 may not be the only filter criterion applied to the sequence of memory access requests, and a further filter criterion may be applied either prior to application of the filter criterion 64. For example, the sequence of memory access requests may first be filtered so that the memory access requests that resulted in a speculative hit (i.e., a hit on a data item that was prefetched into the local storage circuitry 62) are forwarded as part of the filtered memory access requests and the filter criterion 64 is then only applied to those memory access requests that resulted in a hit on a data item that was allocated into the local storage circuitry 62 as a resulted of a demand request.

Figure 4:
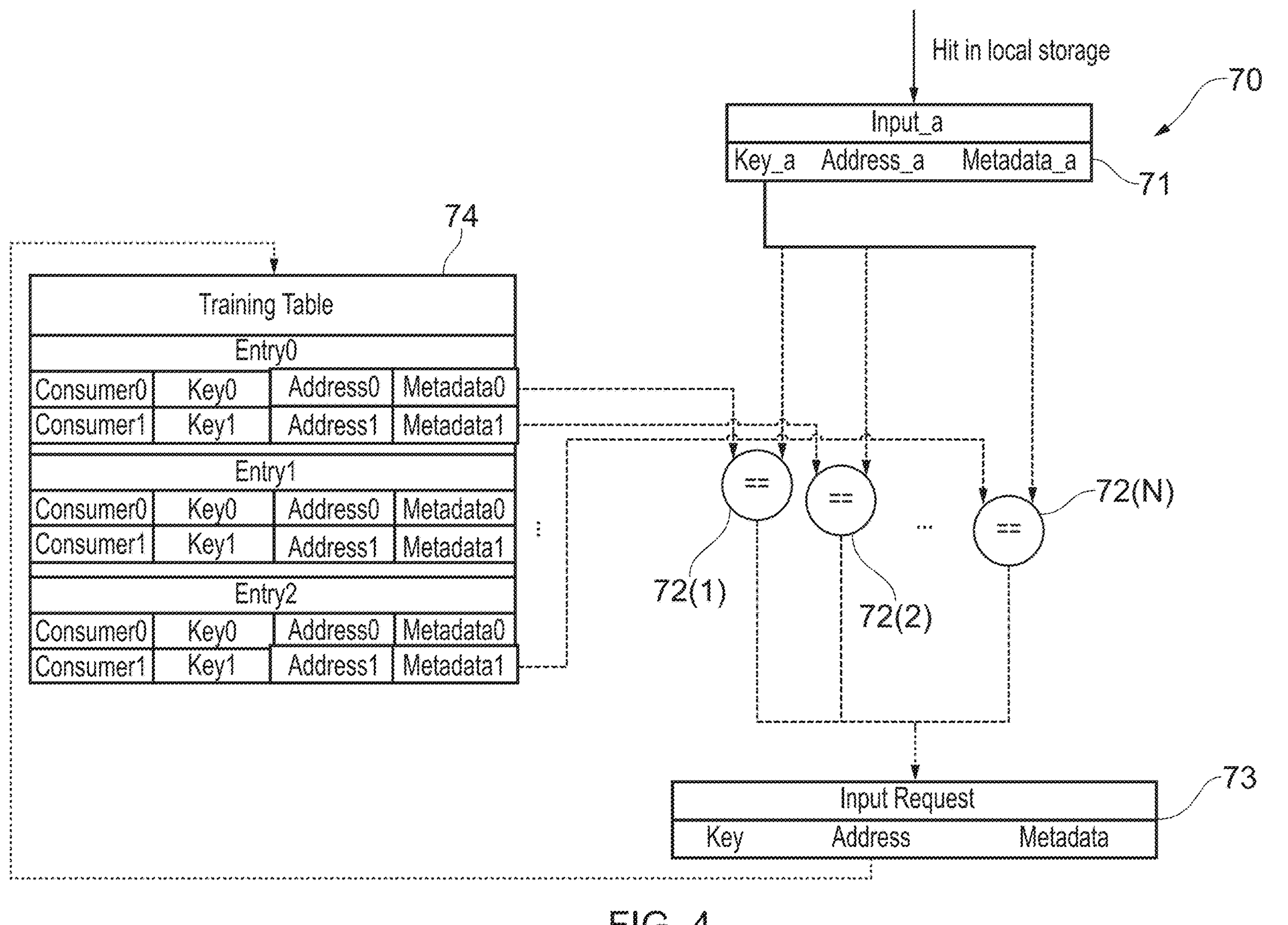
FIG. 4 schematically illustrates an apparatus according to some configurations of the present techniques.

FIG. 4 schematically illustrates an example of an apparatus 70 according to some configurations of the present techniques. The apparatus 70 receives an indication of memory access request 71 that resulted in a hit in the local storage circuitry. The apparatus 70 is provided with filter circuitry which comprises comparison units 72 including comparison unit 1 72(1) through to comparison unit N 72(N). Each of the comparison units 72 receives an indication of a corresponding address stored in the training storage circuitry 74 (otherwise referred to as the training table). Each of the comparison circuits also receives an indication of the address (address_a) indicated in the memory access request 71 and performs a comparison between that address and each of the addresses indicated in the training storage circuitry 74. When the address (address_a) is equal to one or more of the addresses indicated in the training storage circuitry 74, then that memory access request 71 is forwarded as a filtered memory access request 73 to the training circuitry to update the training entries in the training table. When the address (address_a) is not equal to any of the one or more addresses indicated in the training storage circuitry 74, then the memory access request is not forwarded and does not form part of the filtered sequence of memory access requests.

Figure 5:
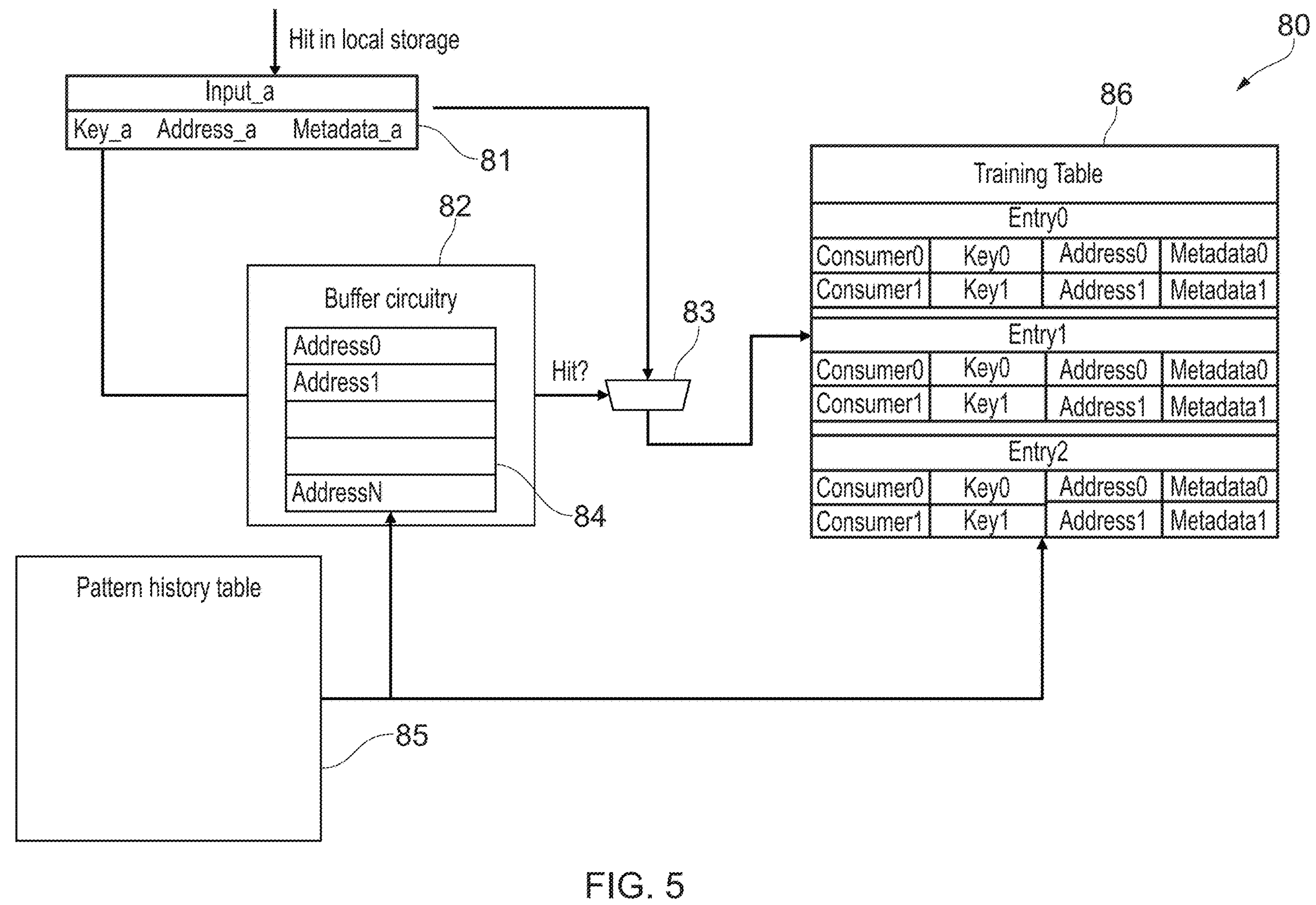
FIG. 5 schematically illustrates an apparatus according to some configurations of the present techniques.

FIG. 5 schematically illustrates further details an apparatus 80 according to some configurations of the present techniques. The apparatus 80 is provided with buffer circuitry 82 and switch circuitry 83. The buffer circuitry 82 comprises a list 84 of addresses. The list 84 is compiled from addresses stored in the training table 86 at the time of storing the training entries into the training table 86. In the illustrated configuration there is also provided a pattern history table 85. The pattern history table 85 stores a plurality of patterns each comprising data indicative of a trigger memory access request and one or more relationships between the trigger memory access request and subsequent memory access requests. The apparatus 80 selects entries of the pattern history table 85 to be trained by the training table 86. The number of entries trained in the training table 86 at a given time is typically much smaller than the number of entries stored in the pattern history table 85. When entries are selected from the pattern history table 85 to be trained in the training table, in addition to those entries being stored in the training table 86, an indication of each of the addresses comprised in the entries is stored in the list 84 comprised in the buffer circuitry. On receipt of a memory access request 81, the address (address_a) indicated in the memory access request 81 is passed to the buffer circuitry 82 which compares that address to the addresses stored in the list 84. If the address indicated in the memory access request 81 matches one of the addresses stored in the list 84, then the buffer circuitry 82 indicates a hit to the switch circuitry 83 which forwards the memory access request 81 to the training table 86 to update the training entries stored in the training table 86. If the address indicated in the memory access request 81 does not match any of the addresses store din the list 84, then the buffer circuitry 82 indicates a miss to the switch circuitry 83 which prevents the memory access request 81 from being forwarded to the training table 86.

Figure 6:
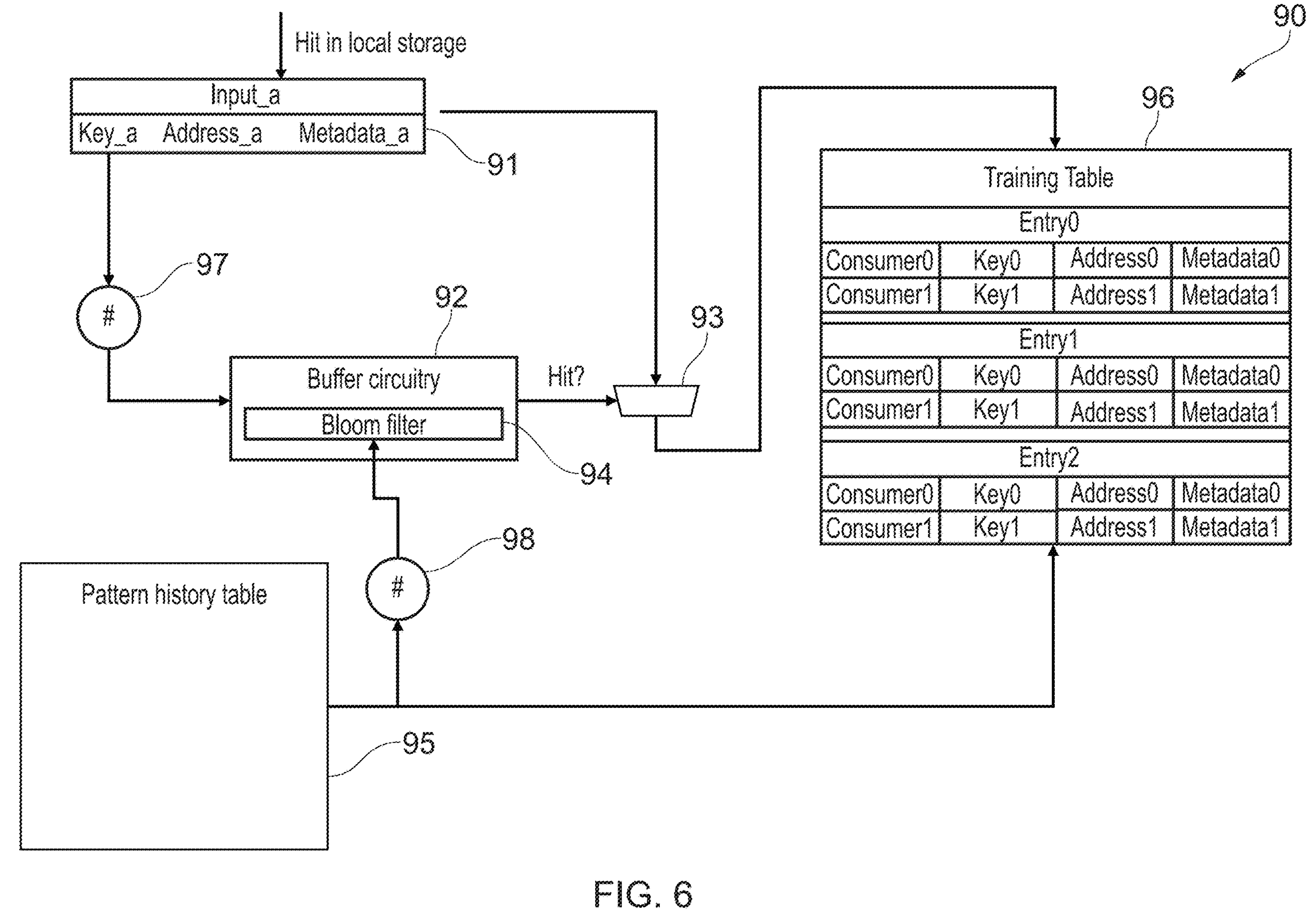
FIG. 6 schematically illustrates an apparatus according to some configurations of the present techniques.

FIG. 6 schematically illustrates further details of an apparatus 90 according to some configurations of the present techniques. The apparatus 90 is provided with buffer circuitry 92 and switch circuitry 93. The buffer circuitry 92 comprises a Bloom filter 94 which stores a hash comprised of a logical OR of hash values generated from addresses indicated in the training table 96. The apparatus 90 is also provided with a pattern history table 95 and, on selection of an entry of the pattern history table 95 to be trained in the training table 96, in addition to storing the entry as a training entry in the training table 96, an indication of each of the addresses comprised in the entry is passed to hash circuitry 98 which generates a hash of the addresses to be comprised in the Bloom filter. On receipt of a memory access request 91, the address (address_a) indicated in the memory access request 91 is passed to hash circuitry 97 to generate a hash value. The hash value is then passed to the buffer circuitry 92 which compares that hash value to the combined has value stored in the Bloom filter 94. The comparison may involve, for example, performing a logical AND between the hash value and the combined hash value. If the result of the logical AND is equal to the hash value, then the hash value is comprised in the combined hash value and a match is indicated. If the hash generated from the address indicated in the memory access request 91 matches against the Bloom filter 94, then the buffer circuitry 92 indicates a hit to the switch circuitry 93 which forwards the memory access request 91 to the training table 96 to update the training entries stored in the training table 96. If the hash of the address indicated in the memory access request 91 does not result in a hit in the Bloom filter 94, then the buffer circuitry 92 indicates a miss to the switch circuitry 93 which prevents the memory access request 91 from being forwarded to the training table 96.

Figure 7:
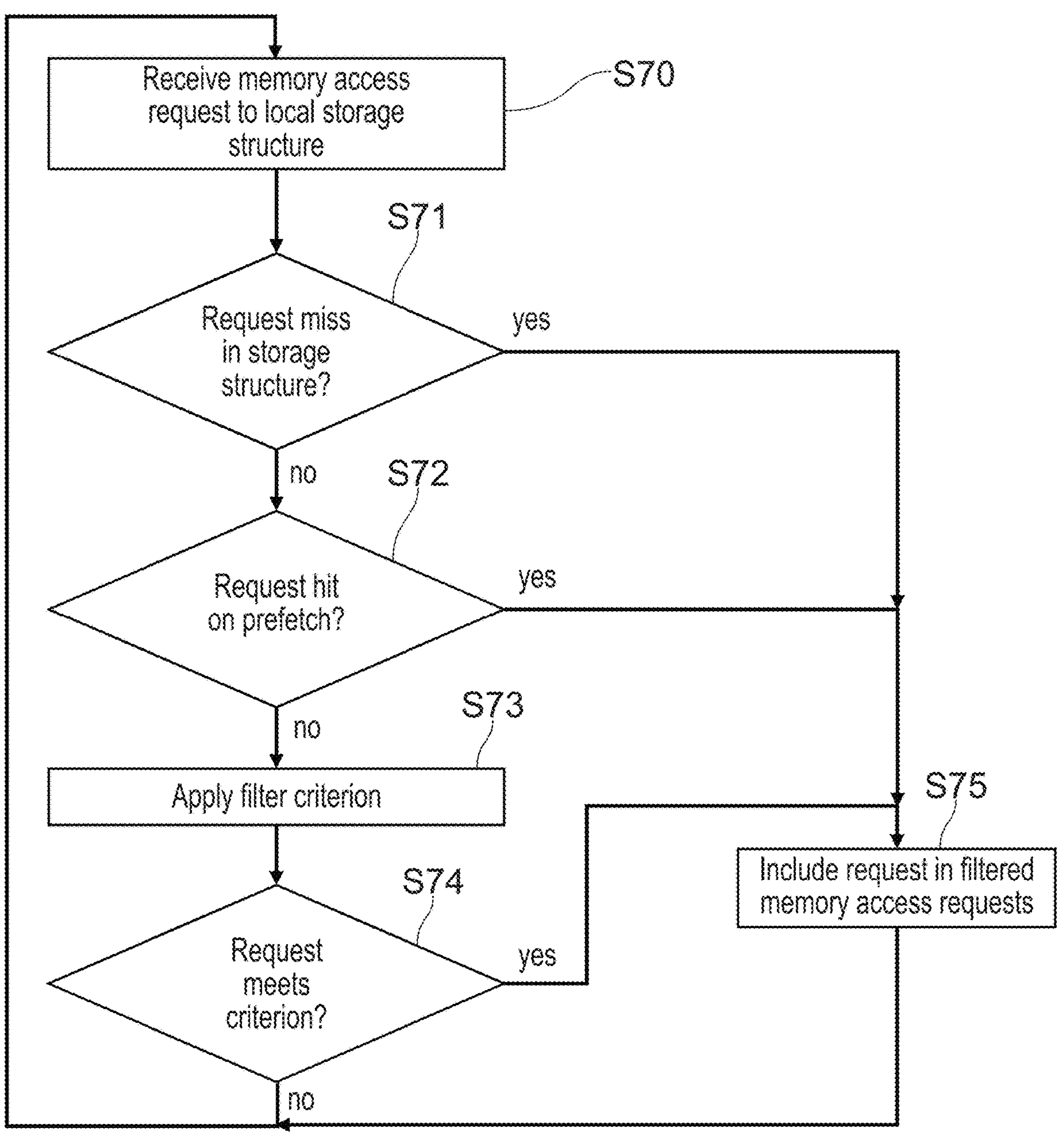
FIG. 7 schematically illustrates a sequence of steps according to some configurations of the present techniques.

FIG. 7 schematically illustrates a sequence of steps carried out according to some configurations of the present techniques. Flow begins at step S70 where a memory access request to local storage structure is received. Flow then proceeds to step S71 where it is determined if the request results in a miss in the local storage structure. If, at step S71, it is determined that the request resulted in a miss in the local storage structure, then flow proceeds to step S75 where the memory access request is included in the filtered list of memory access requests before flow returns to step S70. If, at step S71, it is determined that the request does not miss in the local storage structure, then flow proceeds to step S72. At step S72, it is determined whether the request resulted in a hit on a data item that was prefetched into the local storage circuitry. If, at step S72, it is determined that the request resulted in a hit on a data item that was prefetched into the local storage structure, then flow proceeds to step S75. If, at step S72, it was determined that the request did not result in a hit on a data item that was prefetched into the local storage circuitry, then flow proceeds to step S73 where a filter criterion is applied. Flow then proceeds to step S74 where it is determined if the request meets the filter criterion. If, at step S74, it is determined that the request meets the filter criterion, then flow proceeds to step S75. If, at step S74, it is determined that the request does not meet the filter criterion, then flow returns to step S70, i.e., without including the request in the filtered sequence of memory access requests.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 8:
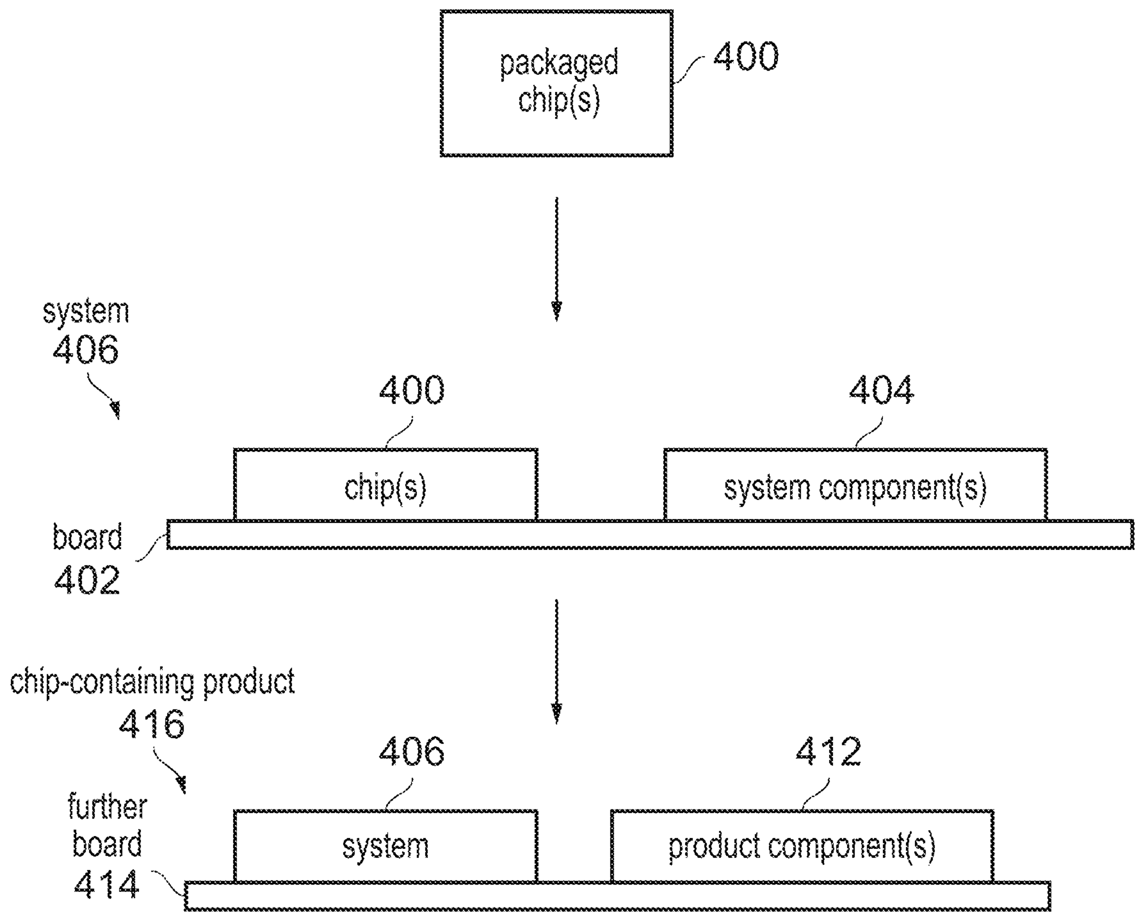
FIG. 8 schematically illustrates a system and a chip containing product according to some configurations of the present techniques.

As shown in FIG. 8, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company. The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In brief overall summary there is provided an apparatus comprising training storage circuitry configured to store training entries, each comprising training data indicative of a trigger memory access request to local storage. The apparatus comprises filter circuitry to generate a filtered sequence of memory access requests by applying a filter to a sequence of memory access requests. The apparatus comprises training circuitry to monitor the filtered sequence, and responsive to observation of the trigger memory access request indicated in a training entry, to update the training data in the training entry. The filter circuitry is configured for each memory access request of the sequence that resulted in a hit on a data item in the local storage, to include the memory access request in the filtered sequence in dependence on a filter criterion independent of a type of request that resulted in the data item being allocated to the local storage.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some configurations of the present techniques are described by the following numbered clauses:

Clause 1. An apparatus comprising:

training storage circuitry configured to store one or more training entries, each of the one or more training entries comprising training data indicative of a trigger memory access request to a local storage structure and one or more relationships between the trigger memory access request and subsequent memory access requests to the local storage structure, wherein the training data is suitable to be used for generation of speculative memory access requests for retrieval of data into the local storage structure by a predictive structure in response to observation of the trigger memory access request;

filter circuitry configured to generate a filtered sequence of memory access requests by applying a filter to a sequence of memory access requests to the local storage structure; and training circuitry configured to monitor the filtered sequence of memory access requests, and responsive to observation of the trigger memory access request indicated in a training entry of the one or more training entries, to update the training data in the training entry based on the filtered sequence of memory access requests, wherein:

the filter circuitry is configured for each given memory access request of the sequence of memory access requests that resulted in a hit on a data item in the local storage structure, to include the given memory access request in the filtered sequence of memory access requests in dependence on a filter criterion; and the filter criterion is independent of a type of request that resulted in the data item being allocated into the local storage structure.

Clause 2. The apparatus of clause 1, wherein the filter criterion is based on the training data comprised in the one or more training entries.

Clause 3. The apparatus of clause 2, wherein the filter circuitry is configured:

to perform a determination, for each given memory access request of the sequence of memory access requests that resulted in a hit on a data item in the local storage structure, of whether the given memory access request is comprised in the training data comprised in the one or more training entries; and in response to the given memory access request being comprised in the training data, to include the given memory access request in the filtered sequence of memory access requests.

Clause 4. The apparatus of clause 3, wherein the determination comprises performing a lookup based on an identifier derived from the given memory access request.

Clause 5. The apparatus of clause 4, wherein the identifier comprises at least one of:

a hash of a program counter value of the given memory access request; and a micro operation identifier of the given memory access request assigned during processing of the given memory access request.

Clause 6. The apparatus of clause 4 or clause 5, wherein the determination comprises performing the lookup in the training storage circuitry.

Clause 7. The apparatus of clause 4 or clause 5, comprising buffer storage circuitry configured to store training data identifying information derived from the training data and indicative of the trigger memory access request and/or the subsequent memory access requests indicated in the training data, wherein the determination comprises performing the lookup in the buffer storage circuitry.

Clause 8. The apparatus of clause 7, wherein the training data identifying information comprises a list of training identifiers associated with the trigger memory access request and/or the subsequent memory access requests indicated in the training data.

Clause 9. The apparatus of clause 7 or clause 8, wherein the training data identifying information comprises a combined hash value derived by combining training identifiers associated with the trigger memory access request and/or the subsequent memory access requests indicated in the training data.

Clause 10. The apparatus of clause 9, wherein the buffer storage circuitry is configured as a Bloom filter and the combined hash value is derived by applying the Bloom filter to the training identifiers.

Clause 11. The apparatus of any preceding clause, wherein the predictive structure is prefetching circuitry configured to speculatively issue prefetch requests for the data to be retrieved into the local storage structure in advance of a demand request for the data.

Clause 12. The apparatus of clause 11, wherein the prefetching circuitry is arranged as indirect prefetching circuitry configured to prefetch producer data indicative of a consumer memory address, and to prefetch consumer data based on the consumer memory address.

Clause 13. The apparatus of clause 12, wherein the filter circuitry is configured to include the given memory access request in the filtered sequence of memory access requests when the given memory access request is identified as a prefetch request for consumer data in the training data.

Clause 14. The apparatus of any preceding clause, wherein:

the filter circuitry is responsive to the monitored access request satisfying the filter criterion, to include the monitored memory access request in the filtered sequence of memory access requests; and the filter circuitry is responsive to the monitored access request failing to satisfy the filter criterion, to exclude the monitored memory access request from the filtered sequence of memory access requests.

Clause 15. The apparatus of any preceding clause, wherein the filter circuitry is configured to include in the filtered sequence of memory access requests at least a first set of the sequence of memory access requests that resulted in a hit in the local storage structure, and to exclude from the filtered sequence of memory access requests at least a second set of the sequence of memory access requests that resulted in a hit in the local storage structure.

Clause 16. The apparatus of clause 15, wherein:

the first set comprises memory access requests that are already identified in at least one of the one or more training entries; and the second set comprises memory access requests that are not identified in at least one of the one or more training entries.

Clause 17. A system comprising:

the apparatus of any preceding clause, implemented in at least one packaged chip;

at least one system component; and a board, wherein the at least one packaged chip and the at least one system component are assembled on the board.

Clause 18. A chip-containing product comprising the system of clause 17, wherein the system is assembled on a further board with at least one other product component.

Clause 19. A method of operating an apparatus comprising training storage circuitry configured to store one or more training entries, each of the one or more training entries comprising training data indicative of a trigger memory access request to a local storage structure and one or more relationships between the trigger memory access request and subsequent memory access requests to the local storage structure, wherein the training data is suitable to be used for generation of speculative memory access requests for retrieval of data into the local storage structure by a predictive structure in response to observation of the trigger memory access request, the method comprising:

generating a filtered sequence of memory access requests by applying a filter to a sequence of memory access requests to the local storage structure;

for each given memory access request of the sequence of memory access requests that resulted in a hit on a data item in the local storage structure, including the given memory access request in the filtered sequence of memory access requests in dependence on a filter criterion, wherein the filter criterion is independent of a type of request that resulted in the data item being allocated into the local storage structure;

monitoring the filtered sequence of memory access requests; and in response to observation of the trigger memory access request indicated in a training entry of the one or more training entries, updating the training data in the training entry based on the filtered sequence of memory access requests.

Clause 20. A non-transitory computer-readable medium storing computer-readable code for fabrication of the apparatus according to any of clauses 1 to 16.

We claim:

1. An apparatus comprising:

training storage circuitry configured to store one or more training entries, each of the one or more training entries comprising training data indicative of a trigger memory access request to a local storage structure and one or more relationships between the trigger memory access request and subsequent memory access requests to the local storage structure, wherein the training data is suitable to be used for generation of speculative memory access requests for retrieval of data into the local storage structure by a predictive structure in response to observation of the trigger memory access request;

filter circuitry configured to generate a filtered sequence of memory access requests by applying a filter to a sequence of memory access requests to the local storage structure; and training circuitry configured to monitor the filtered sequence of memory access requests, and responsive to observation of the trigger memory access request indicated in a training entry of the one or more training entries, to update the training data in the training entry based on the filtered sequence of memory access requests, wherein:

the filter circuitry is configured for each given memory access request of the sequence of memory access requests that resulted in a hit on a data item in the local storage structure, to include the given memory access request in the filtered sequence of memory access requests in dependence on a filter criterion; and the filter criterion is independent of a type of request that resulted in the data item being allocated into the local storage structure.

2. The apparatus of claim 1, wherein the filter criterion is based on the training data comprised in the one or more training entries.

3. The apparatus of claim 2, wherein the filter circuitry is configured:

to perform a determination, for each given memory access request of the sequence of memory access requests that resulted in a hit on a data item in the local storage structure, of whether the given memory access request is comprised in the training data comprised in the one or more training entries; and in response to the given memory access request being comprised in the training data, to include the given memory access request in the filtered sequence of memory access requests.

4. The apparatus of claim 3, wherein the determination comprises performing a lookup based on an identifier derived from the given memory access request.

5. The apparatus of claim 4, wherein the identifier comprises at least one of:

a hash of a program counter value of the given memory access request; and a micro operation identifier of the given memory access request assigned during processing of the given memory access request.

6. The apparatus of claim 4, wherein the determination comprises performing the lookup in the training storage circuitry.

7. The apparatus of claim 4, comprising buffer storage circuitry configured to store training data identifying information derived from the training data and indicative of the trigger memory access request and/or the subsequent memory access requests indicated in the training data, wherein the determination comprises performing the lookup in the buffer storage circuitry.

8. The apparatus of claim 7, wherein the training data identifying information comprises a list of training identifiers associated with the trigger memory access request and/or the subsequent memory access requests indicated in the training data.

9. The apparatus of claim 7, wherein the training data identifying information comprises a combined hash value derived by combining training identifiers associated with the trigger memory access request and/or the subsequent memory access requests indicated in the training data.

10. The apparatus of claim 9, wherein the buffer storage circuitry is configured as a Bloom filter and the combined hash value is derived by applying the Bloom filter to the training identifiers.

11. The apparatus of claim 1, wherein the predictive structure is prefetching circuitry configured to speculatively issue prefetch requests for the data to be retrieved into the local storage structure in advance of a demand request for the data.

12. The apparatus of claim 11, wherein the prefetching circuitry is arranged as indirect prefetching circuitry configured to prefetch producer data indicative of a consumer memory address, and to prefetch consumer data based on the consumer memory address.

13. The apparatus of claim 12, wherein the filter circuitry is configured to include the given memory access request in the filtered sequence of memory access requests when the given memory access request is identified as a prefetch request for consumer data in the training data.

14. The apparatus of claim 1, wherein:

the filter circuitry is responsive to the monitored access request satisfying the filter criterion, to include the monitored memory access request in the filtered sequence of memory access requests; and the filter circuitry is responsive to the monitored access request failing to satisfy the filter criterion, to exclude the monitored memory access request from the filtered sequence of memory access requests.

15. The apparatus of claim 1, wherein the filter circuitry is configured to include in the filtered sequence of memory access requests at least a first set of the sequence of memory access requests that resulted in a hit in the local storage structure, and to exclude from the filtered sequence of memory access requests at least a second set of the sequence of memory access requests that resulted in a hit in the local storage structure.

16. The apparatus of claim 15, wherein:

the first set comprises memory access requests that are already identified in at least one of the one or more training entries; and the second set comprises memory access requests that are not identified in at least one of the one or more training entries.

17. A system comprising:

the apparatus of claim 1, implemented in at least one packaged chip;

at least one system component; and a board, wherein the at least one packaged chip and the at least one system component are assembled on the board.

18. A chip-containing product comprising the system of claim 17, wherein the system is assembled on a further board with at least one other product component.

19. A method of operating an apparatus comprising training storage circuitry configured to store one or more training entries, each of the one or more training entries comprising training data indicative of a trigger memory access request to a local storage structure and one or more relationships between the trigger memory access request and subsequent memory access requests to the local storage structure, wherein the training data is suitable to be used for generation of speculative memory access requests for retrieval of data into the local storage structure by a predictive structure in response to observation of the trigger memory access request, the method comprising:

generating a filtered sequence of memory access requests by applying a filter to a sequence of memory access requests to the local storage structure;

for each given memory access request of the sequence of memory access requests that resulted in a hit on a data item in the local storage structure, including the given memory access request in the filtered sequence of memory access requests in dependence on a filter criterion, wherein the filter criterion is independent of a type of request that resulted in the data item being allocated into the local storage structure;

monitoring the filtered sequence of memory access requests; and in response to observation of the trigger memory access request indicated in a training entry of the one or more training entries, updating the training data in the training entry based on the filtered sequence of memory access requests.

20. A non-transitory computer-readable medium storing computer-readable code for fabrication of an apparatus comprising:

training storage circuitry configured to store one or more training entries, each of the one or more training entries comprising training data indicative of a trigger memory access request to a local storage structure and one or more relationships between the trigger memory access request and subsequent memory access requests to the local storage structure, wherein the training data is suitable to be used for generation of speculative memory access requests for retrieval of data into the local storage structure by a predictive structure in response to observation of the trigger memory access request;

filter circuitry configured to generate a filtered sequence of memory access requests by applying a filter to a sequence of memory access requests to the local storage structure; and training circuitry configured to monitor the filtered sequence of memory access requests, and responsive to observation of the trigger memory access request indicated in a training entry of the one or more training entries, to update the training data in the training entry based on the filtered sequence of memory access requests, wherein:

the filter circuitry is configured for each given memory access request of the sequence of memory access requests that resulted in a hit on a data item in the local storage structure, to include the given memory access request in the filtered sequence of memory access requests in dependence on a filter criterion; and the filter criterion is independent of a type of request that resulted in the data item being allocated into the local storage structure.

* * * * *